Jan. 17, 1961  E. L. MERRITT  2,968,228
ZENITH AND LEVEL RECORDING CAMERA AND LEVEL
Filed Dec. 2, 1955  3 Sheets-Sheet 1

INVENTOR
EVERETT L. MERRITT
BY Walter S. Paul
ATTORNEY

Jan. 17, 1961     E. L. MERRITT     2,968,228
ZENITH AND LEVEL RECORDING CAMERA AND LEVEL
Filed Dec. 2, 1955     3 Sheets-Sheet 2

INVENTOR
EVERETT L. MERRITT

BY Walter S. Pawl.
ATTORNEY

Jan. 17, 1961     E. L. MERRITT     2,968,228
ZENITH AND LEVEL RECORDING CAMERA AND LEVEL
Filed Dec. 2, 1955     3 Sheets-Sheet 3
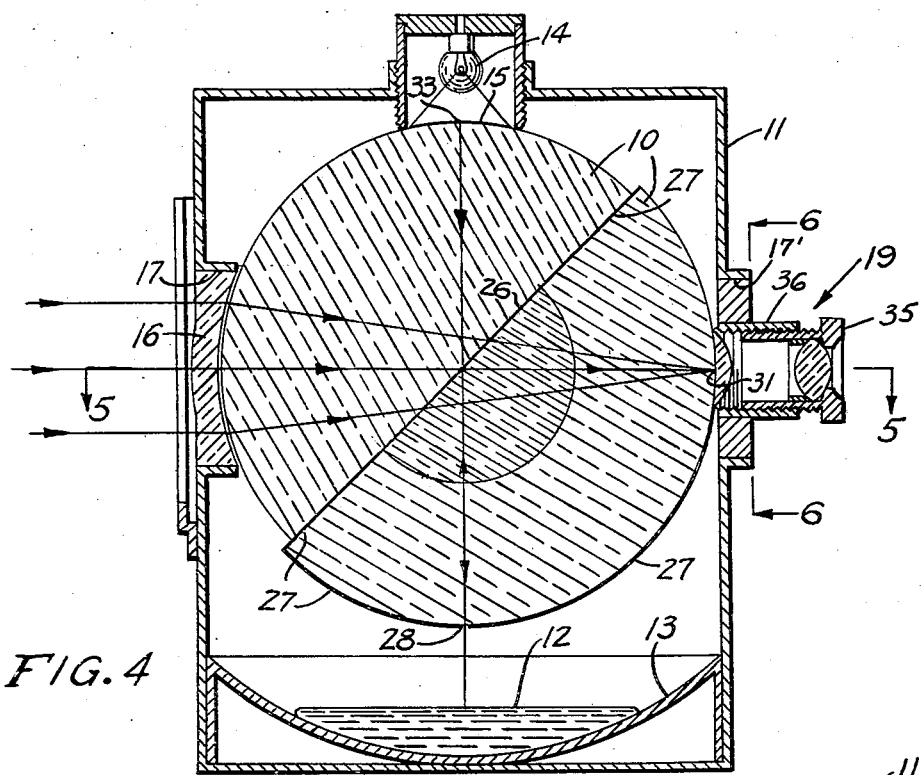
FIG. 4
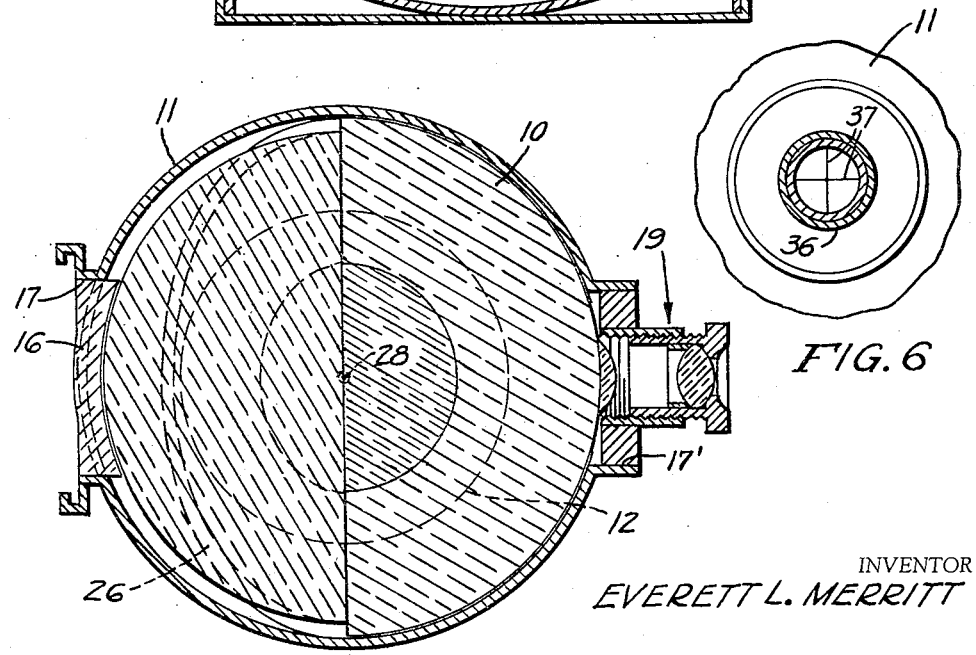
FIG. 5
FIG. 6
INVENTOR
EVERETT L. MERRITT
BY Walter S. Paul.
ATTORNEY United States Patent Office 2,968,228
Patented Jan. 17, 1961

2,968,228
ZENITH AND LEVEL RECORDING CAMERA AND LEVEL

Everett L. Merritt, Falls Church, Va., assignor to Photogrammetry, Inc., Silver Spring, Md., a corporation of Delaware Filed Dec. 2, 1955, Ser. No. 550,519
8 Claims. (Cl. 95—11)

The present invention relates to astronomic position cameras which may also be adapted for use as level position cameras or as levels.

The object of the present invention is to provide an astronomic position camera that may be operated by untrained personnel in making star position exposures without requiring time lapses, reverse exposure or spirit levelling of the camera.

Another object is to provide means in an astronomic position camera for automatically recording the exact zenith point position on the exposure regardless of its deviation from the principal point of the exposure.

A further object is to provide an astronomic camera with means for maintaining a light beam reflected from a liquid surface automatically trained on the point in the exposure surface corresponding to the zenith point, simulating the image of a zenithal star, regardless of any slight tilting of the vertical axis of the camera from normal.

A further object is to provide an astronomic camera with concentric spherical lenses having a median semi-reflecting surface at an angle 45° to the camera axis, a liquid surface below said lens, a light beam projected from the zenith point of said lens through a pinhole aperture in the opaque lower surface of the lens, so that the reflection of the lighted pinhole from the liquid surface will return through said pinhole and be reflected from said semi-reflecting median surface in said lens, and orient itself on the exposure surface at the rear of the lens in a position corresponding to the image of the true zenith reflected in a 45° mirror mounted on the camera in front of said lens.

A further object is to adapt the above camera for use as a level recording camera by removing the mirror in front of the lens, so that the horizontal rays from the horizon or other level reference may be recorded at the corresponding level on the exposure.

A further object is to adapt the above camera for use as a level by removing the mirror in front of the lens and replacing the film holding and exposure operating means at the rear of the lens by a sighting eyepiece lens with centered cross hairs, for adjusting the level by bringing the pinhole image to the cross hairs before each pointing.

Other and more specific objects will appear in the following detailed description of the essential parts of the present invention, as illustrated in the accompanying drawings, wherein.

Figure 1:
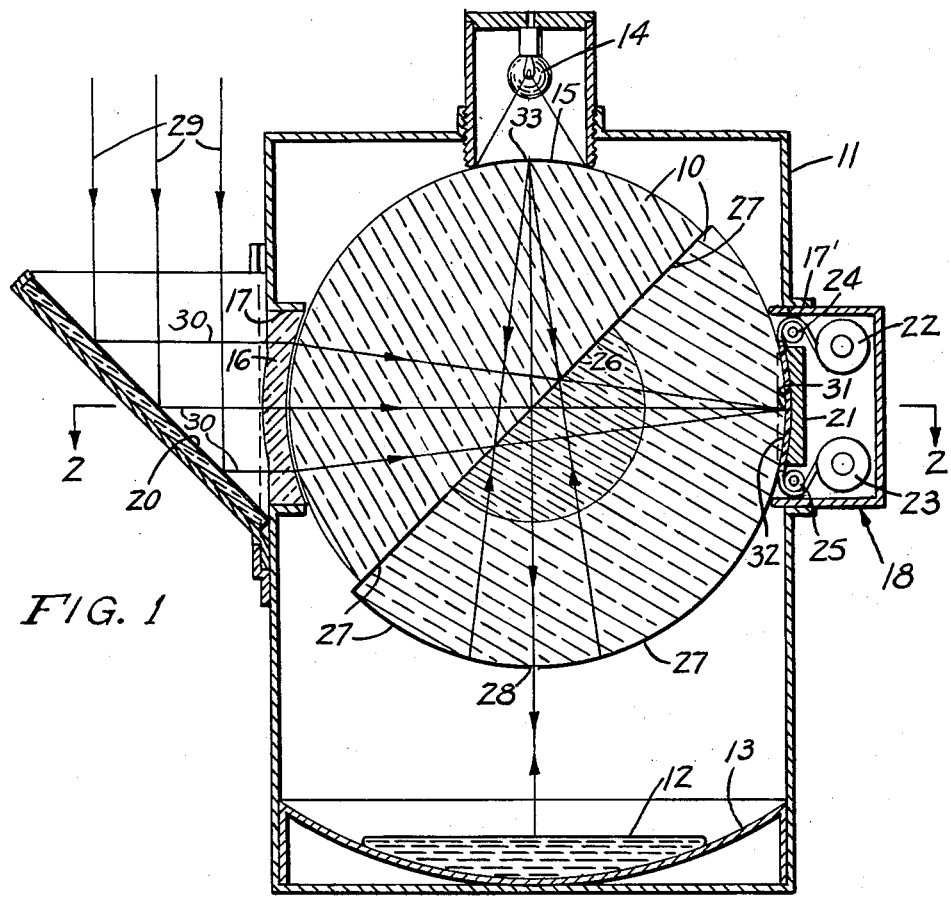
Fig. 1 is a vertical sectional view taken on the axis of the camera.
Figure 2:
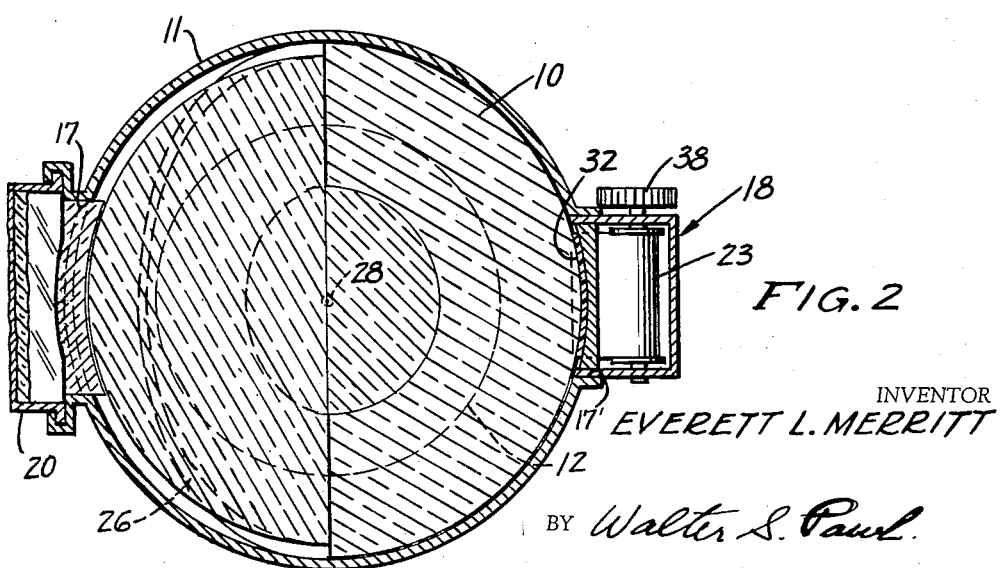
Fig. 2 is a horizontal cross section taken on the line 2—2 of Fig. 1.
Figure 3:
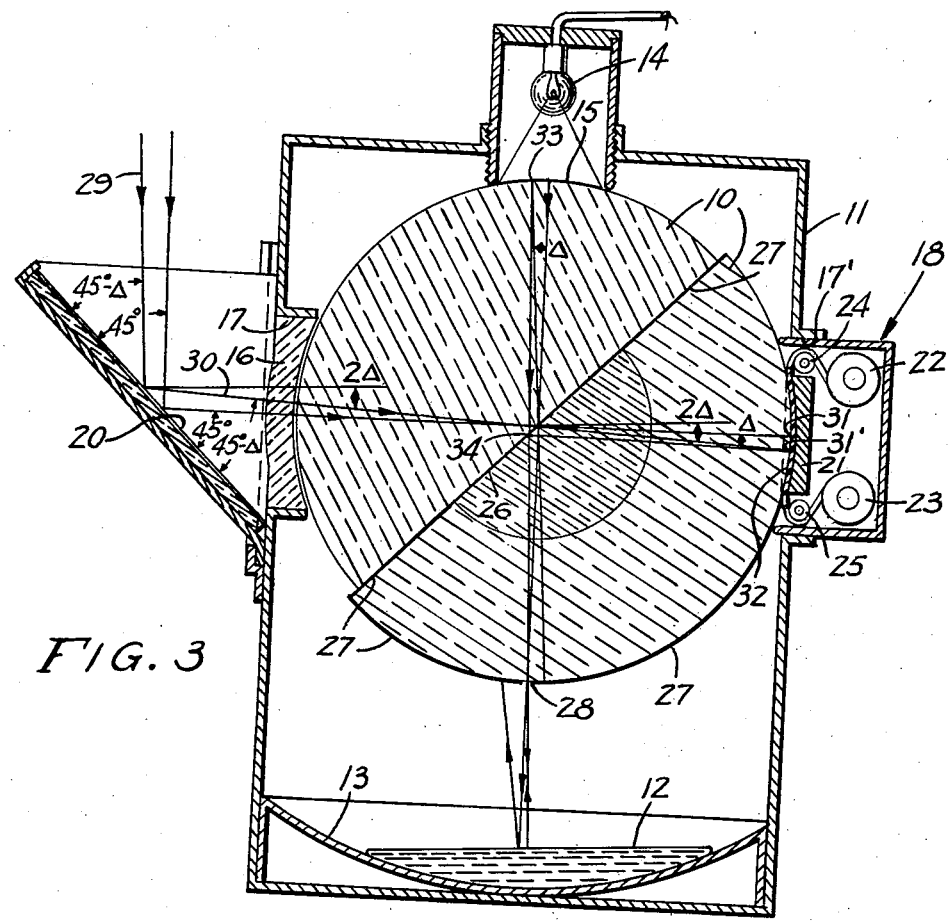
Figure 7:
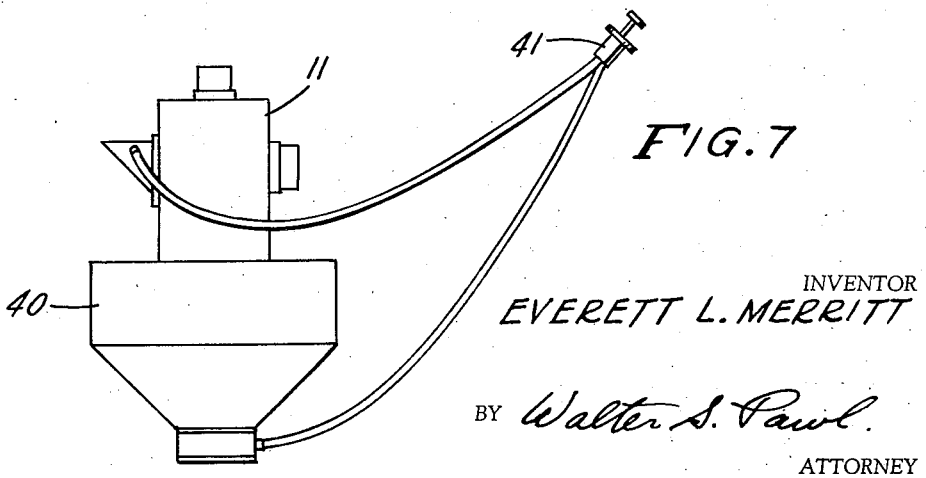

Fig. 3 is a view similar to Fig. 1, indicating a tilted position of the camera having its axis inclined by an angle Δ to the horizontal, Fig. 4 shows an adaptation of the camera for use as a level, Fig. 5 is a horizontal sectional view taken on the line 5—5 of Fig. 4, Fig. 6 is a sectional view of the eyepiece of the device adapted for use as a level, taken on the line 6—6 of Fig. 4, and Fig. 7 is a side elevation of a combination of the astronomic camera with a nadir air photo camera.

Although there are many uses for a camera-level device such as illustrated, one of its more important uses may be to serve as an integral part of a nadir aerial photographic camera by mounting it rigidly in normal axial alignment on such camera, so that when simultaneous exposures are made at night by both cameras, the astronomic camera will obtain a record of the right ascension and declination as well as the tilt of the cameras, provided atmospheric conditions are favorable for stable flight. Obviously, the liquid in the present device used for maintaining a horizontal reflecting surface for the pin-hole light beam could be replaced by a gyroscopically levelled solid mirror surface, in order to avoid accidental displacement of the mirror due to undesirable accelerations in normal flight which may not be stable enough in many present day aircraft. A very small gyro unit could be used with a mirror of small mass centrally supported in it, for this purpose, since it would require a minimum of effort to stabilize such a mirror. In daylight exposures, the astronomic camera may be used as a horizontal or level camera for recording the tilt and swing of the aerial camera in conjunction with which it is used as a recording level, if it is pointed toward a known target near the horizon and in a known compass direction. An actual compass may be included in its line of view so that the compass reading may be simultaneously and automatically recorded. Of course, if it is used as a level merely to obtain a vertical photo by the aerial camera, it may be quickly levelled by looking into the eyepiece and bringing the reflected pinhole light in register with centered cross hairs in the eyepiece at the instant the aerial camera is operated. In this case the front aperture may be covered to darken the field of view so that the reflected pinhole light may be more clearly visible.

Obviously, the device may be used independently as a position recording camera at any instant by inexperienced personnel, because it is not necessary to first level the camera for a true zenith exposure; nor is there any substantial time exposure required with present day fast lenses and films.

When used as a level, it may also be used to determine or measure the angular displacement of a target from the horizontal axis of the instrument, by including a scale of indicia along the vertical cross hair, and sighting in the direction of the target while maintaining the reflected pinhole light on the horizontal cross hair. Many other obvious uses and adaptations of this device will present themselves to those engaged in photography, astronomy, observation, surveying, navigation, photogrammetry, and related arts.

The basic essential arrangement of parts of the present device is shown more or less schematically in the drawings, where a spherical lens 10 is mounted in an enclosure 11 which is provided with a reflecting liquid 12 in a depression 13 under the lens, a source of light 14 in its upper portion supplying illumination to a diffusing plate or ground surface 15 at the top of the lens, an aspheric correction plate 16 in an aperture 17 at the front of the lens 10 and an opening 17' at the rear of the lens in alignment with said aperture, for optional mounting of either a film holding and feeding assembly 18 to take exposures, or an eyepiece 19 to sight through the instrument. Any conventional shutter controls may be used, although none are shown, for the sake of simplicity.

A plane mirror 20 may be removably mounted at a precise 45° angle to the horizontal axis of the instrument when used as a zenith recording camera.

The film holding assembly 18 is provided with a concentric platen 21 for pressing the film evenly against the spherical lens at the time of exposure. Conventional film rolls 22 and 23, rollers 24 and 25, and feeding controls 38 may be used.

The lens 10, made up of concentric spherical portions of three radii, of lens material having required characteristics to make up a composite spherical lens having the required focal length, is lightly silvered in a central plane normal to the vertical axial plane and inclined 45° to the horizontal, so as to provide a semi-reflecting surface 26 extending through the smallest spherical portion. The bottom surface of the lens and the plane surface in extension of the above semi-reflecting surface have a non-reflecting opaque coating 27 except for a transparent pinhole 28 on the vertical axis on the bottom surface.

The focal distance of a spherical lens is such that a bundle of parallel rays passing into it will converge on a point at the opposite surface on the principal axis of the lens which is parallel to the entering rays. Thus the zenith rays 29 in Fig. 1, where the camera is in a level position, will, after reflection by mirror 20, enter the lens 10 as parallel horizontal rays 30 and will converge at the principal point 31 on the exposure surface 32 of the film. The field around the zenith will provide small bundles of rays from any stars or other present sources of light which will be projected to corresponding points on the exposure surface, thus reproducing the view of the astronomical bodies appearing around the zenith. At the same time a small bundle of rays originating at the center point of plate 15 will be the only rays from this plate passing through the pinhole 28 which will strike the liquid surface normally, and will therefore be reflected back into said pinhole, whence they will reach the semi-reflecting surface 26 and be reflected along the horizontal axis of the lens to the principal point 31, indicating that the camera is in level position.

Should the camera be tilted, the image of the pinhole light rays will be displaced from the principal point exactly in the same way as any zenith rays entering the camera would be displaced. For example, in Fig. 3, where the camera is shown tilted backward through an angle Δ, the zenith rays 29 make an angle of 45°—Δ with mirror 20. The principal ray 30 passing through the lens representing these rays reflected from the mirror also makes an angle of 45°—Δ with the mirror, or Δ with the axis of the principal point 31 or 2Δ with the horizontal. Thus the image 31' of the zenith rays will be displaced Δ from the principal point 31, as shown in this figure. The pinhole light now reflected from the liquid follows the ray from the new source point 33 displaced Δ from the center point of the plate 15, and is reflected by the semi-reflecting surface at 34 to the point on the exposure surface coincident with the image of the zenith ray, or the point where this image would be if there were any zenith rays, which is displaced Δ from the principal point in the corresponding direction on the exposure surface.

It may be shown geometrically that any tilting of the camera in any other direction will likewise cause the liquid level to reflect only the pinhole light rays which will be reflected to the point on the exposure surface corresponding to the image of any zenith rays that might be projected by the camera lens in whatever tilted attitude it has assumed.

By removing the mirror 20, the camera may be used to take views of the horizon or other horizontal or cross hair references for recording the tilt of the camera during exposure.

By further removing the film holder 18 and replacing it with an eyepiece 25, the transformation to a simple level is achieved. A lens adapter 36 may be mounted in the eyepiece with cross hairs 37 or any other reference scales or indicia to facilitate levelling the instrument or measuring its deviations from a level position, or the angular devations of other reference points that may be sighted, from the horizontal or azimuthal relation to the instrument.

The combination in Fig. 7 illustrates a manner in which the astronomic camera 11 may be fixed to a nadir aerial photo camera 40, and the shutter controls connected to a common plunger mechanism 41 for simultaneous exposures in both cameras for the purpose of recording position as well as tilt of the cameras.

Thus, it is evident that a very versatile yet simple instrument has been conceived which is adaptable for many uses, in each case providing advantages not possible of attainment with previous forms used for corresponding purposes.

In navigation alone, considering the high speeds attainable today, it is extremely important, and the present camera has for the first time made it possible, to obtain immediate information on position by recording the zenith position on the astronomical map, or simply sighting through the instrument at the heavenly bodies and observing exactly where the zenith appears, disclosing your position instantly on the celestial map and the corresponding position on the terrestrial map of longitude and latitude.

Instead of indicating the zenith point in the instrument, the pinhole light image may be used to indicate any other reference point in connection with a compass, at any elevation or declination other than at the horizon or the zenith, which represent 0° and 90° elevations, simply by using an appropriate angle for mounting the mirror 20 in front of the instrument, between 0° and 45° to the horizontal for elevations and between 0° and —45° for declinations with respect to the instrument.

The nadir point could thus be used instead of the zenith, by using the —45° position of the mirror, and thus a ground photo could be obtained from the air with the same camera which would record the position of the nadir point thereon. In any of the above variations the indication of the reference point would also indicate the tilt of the camera by reference to the principal point on an exposure, or the cross hairs in observing or sighting a target.

Thus many obvious modifications in the form and relation of parts could be made without departing from the spirit and scope of this invention as defined in the appended claims.

What is claimed is:

1. An optical instrument comprising a casing, a spherical lens mounted therein and having a median semi-silvered surface at a 45° angle to the lateral axial plane of the instrument and perpendicular to the vertical axial plane thereof, said casing having an aperture to admit rays to the front of the lens, said lens having an image surface centered on the optical axis at the rear side of the lens at the focus of infinite rays entering the front of the lens, the bottom of said casing having a dished portion spaced from the bottom of the lens, a quantity of liquid in said dished portion to provide a level reflecting surface, an area source of light at the top of the lens, said lens having an opaque mask on its lower surface with an axial pinhole at the bottom, whereby the ray from said source area which passes through said pinhole and is directed normally to said level reflecting surface, will be reflected thereby back through said pinhole and by said semi-silvered surface to the image surface at a deflected level on the image surface opposite to that of the image of any infinite object in the horizontal plane in response to any slight tilt of the optical axis of said instrument from horizontal, said casing having an aligned opening at the image surface.

2. An instrument as defined in claim 1, and an eyepiece attachment over said opening for visual observation in levelling the instrument or pointing it at a target to determine or measure its angular deviation from the horizontal.

3. An instrument as defined in claim 1, and a film holding and feeding assembly mounted in said opening over the image surface, for use as a level recording camera to take exposures including a record of the horizontal level as indicated by the position of the pinhole light ray on said exposure.

4. An instrument as defined in claim 3, and a 45° mirror mounted on said casing in front of said aperture for use as a zenith recording camera to take exposures of the zenith field and recording the zenith position thereon.

5. An instrument as defined in claim 4, and an aspheric correction plate mounted at the front of said spherical lens.

6. An optical instrument comprising a spherical lens having a median semi-silvered surface at a 45° angle to the lateral axial plane of the instrument and perpendicular to its vertical axial plane, said lens having an image surface coextensive with its spherical surface centered on the optical axis at the rear side of the lens at the focus of infinite rays entering the lens through its forward side, a self-levelling mirror below said lens, an area source of light at the top of said lens, said lens having an opaque mask on its lower surface with an axial pinhole at the bottom, whereby the ray from said area source which passes through said pinhole in a direction normal to said self-levelling mirror, will be reflected back through said pinhole and by said semi-silvered surface to the image surface of said instrument at a deflected level opposite to that of the image of any infinite object on the horizon in response to any slight tilt of the optical axis of the instrument from the horizontal.

7. An instrument as defined in claim 6, an enclosure for said instrument having an aperture for rays entering said lens and an aligned opening at the image surface, and an eyepiece attachment mounted over said opening for visual observation in levelling the instrument or pointing it at a target to determine or measure its angular relation to the horizontal from the point of observation.

8. An instrument as defined in claim 6, an enclosure for said instrument having an aperture for rays entering said lens and an aligned opening at the image surface, and a film holding and feeding assembly mounted in said opening over the image surface, for use as a level recording camera to take exposures including a record of the horizontal level as indicated by the position of the pinhole light ray on said exposure with reference to the principal point.

References Cited in the file of this patent

UNITED STATES PATENTS

| | | |
|---|---|---|
| 1,378,011 | Cregier | May 17, 1921 |
| 1,533,941 | Otto | Apr. 14, 1925 |
| 1,653,585 | Pierce | Dec. 20, 1927 |
| 1,880,960 | Keale | Oct. 4, 1932 |
| 2,047,070 | Horner | July 7, 1936 |
| 2,231,378 | Becker et al. | Feb. 11, 1941 |
| 2,352,644 | Linderman et al. | July 4, 1944 |
| 2,375,356 | Flint | May 8, 1945 |
| 2,402,216 | Venningerholz | June 18, 1946 |
| 2,671,388 | Brubaker | Mar. 9, 1954 |

FOREIGN PATENTS

| | | |
|---|---|---|
| 948,680 | France | Jan. 13, 1949 |
| 1,079,027 | France | May 19, 1954 |

OTHER REFERENCES

Ser. No. 256,012 Santoni (A.P.C.), published May 4, 1943.